(12) United States Patent
Granzeier et al.

(10) Patent No.: US 7,478,781 B2
(45) Date of Patent: Jan. 20, 2009

(54) JOINT COVER IN AIRCRAFT

(75) Inventors: Werner Granzeier, Jork (DE); Andreas Wietzke, Hamburg (DE); Jan Schroeder, Hamburg (DE)

(73) Assignee: Airbus Deutschland GmbH, Hamburg (DE)

( * ) Notice: Subject to any disclaimer, the term of this patent is extended or adjusted under 35 U.S.C. 154(b) by 0 days.

(21) Appl. No.: 11/249,550

(22) Filed: Oct. 13, 2005

(65) Prior Publication Data

US 2006/0102786 A1 May 18, 2006

Related U.S. Application Data

(60) Provisional application No. 60/618,130, filed on Oct. 13, 2004.

(30) Foreign Application Priority Data

Oct. 13, 2004 (DE) .................. 10 2004 049 893

(51) Int. Cl.
*B64C 1/06* (2006.01)
(52) U.S. Cl. .................. 244/131; 244/130; 244/132
(58) Field of Classification Search ............. 244/117 R, 244/118.1–118.6, 119, 121, 120, 129.1–129.5, 244/130, 131–133; 277/345, 590
See application file for complete search history.

(56) References Cited

U.S. PATENT DOCUMENTS

| | | | | |
|---|---|---|---|---|
| 2,118,561 A | * | 5/1938 | Kleeberg | 411/338 |
| 2,219,714 A | * | 10/1940 | Sperry | 52/481.2 |
| 3,110,068 A | * | 11/1963 | Perrochat | 24/297 |
| 3,556,570 A | * | 1/1971 | Cosenza | 411/176 |
| 3,686,795 A | * | 8/1972 | La Barge | 49/345 |
| 3,784,433 A | * | 1/1974 | Garnish et al. | 156/276 |
| 3,939,752 A | * | 2/1976 | Koscik | 411/548 |
| 4,020,611 A | * | 5/1977 | Amos | 52/586.1 |
| 4,067,155 A | * | 1/1978 | Ruff et al. | 52/105 |
| 4,409,274 A | * | 10/1983 | Chaplin et al. | 428/112 |
| 4,536,438 A | * | 8/1985 | Bishop et al. | 442/247 |
| 4,752,415 A | * | 6/1988 | Iwaskow et al. | 252/511 |
| 4,778,320 A | * | 10/1988 | Nakama | 411/509 |
| 5,013,083 A | * | 5/1991 | Yada et al. | 296/213 |
| 5,014,934 A | * | 5/1991 | McClaflin | 244/132 |
| 5,065,960 A | * | 11/1991 | Castellucci | 244/131 |
| 5,275,529 A | * | 1/1994 | Langenbrunner et al. | 415/119 |
| 5,542,158 A | * | 8/1996 | Gronau et al. | 24/295 |
| 5,689,863 A | * | 11/1997 | Sinozaki | 24/297 |

(Continued)

FOREIGN PATENT DOCUMENTS

DE 9406302.8 U1 6/1995

(Continued)

*Primary Examiner*—J. Woodrow Eldred
(74) *Attorney, Agent, or Firm*—Christopher Paradies; Fowler White Boggs P.A.

(57) ABSTRACT

A joint cover in an aircraft has a clamp section and a cover section for covering a joint. The clamp section is used to mount the cover section over the joint. The joint cover conceals the joint and secures the joint from intrusion of foreign objects. One example presents information to passengers, incorporating visual displays or other devices within the cover section. For example, the joint cover may include a cover section and a clamp section of an elastic material that deforms under pressure, concealing the joint even during compression and decompression of the aircraft, which causes movement of the panels defining the joint.

13 Claims, 7 Drawing Sheets

U.S. PATENT DOCUMENTS

| | | | |
|---|---|---|---|
| 5,695,154 A * | 12/1997 | Castellucci et al. | 244/130 |
| 6,042,296 A * | 3/2000 | Wittig et al. | 403/298 |
| 6,317,937 B1 * | 11/2001 | Ishihara et al. | 24/297 |
| 6,712,316 B2 * | 3/2004 | Jones | 244/132 |
| 7,001,128 B2 * | 2/2006 | Kuntze | 411/508 |
| 7,017,239 B2 * | 3/2006 | Kurily et al. | 24/297 |
| 7,096,638 B2 * | 8/2006 | Osterland et al. | 52/708 |
| 2004/0021039 A1 * | 2/2004 | Jones | 244/131 |

FOREIGN PATENT DOCUMENTS

| | | |
|---|---|---|
| DE | 19709374 A1 | 9/1998 |
| GB | 2287517 A | 9/1995 |

* cited by examiner

JOINT COVER IN AIRCRAFT

RELATED APPLICATIONS

This application claims the benefit of the filing date of German Patent Application No. 10 2004 049 893 filed Oct. 13, 2004 and claims the benefit of the filing date of U.S. Provisional Patent Application No. 60/618,130 filed Oct. 13, 2004, the disclosure of which is hereby incorporated by reference herein.

FIELD OF THE INVENTION

The field is aircraft joint covers, which are used to cover joints of a structure in an aircraft.

BACKGROUND OF THE INVENTION

In aircraft, interior furnishings, such as ceiling or wall panels, are attached to the primary structure or other supporting aircraft elements using appropriately mounted holder or attachment elements. The fuselage of the aircraft deforms significantly during flight, because of pressure differences, for example. Therefore, sometimes significant tensions act on the attachments or panel elements, which result in deformation or displacement of the panels and in visual changes of the gap or joint dimensions in relation to one another.

Aircraft cabins are all manufactured by approximately the same technological method. All components, such as wall paneling elements (window panels, window front plates, ceiling panels) receive complex edge radii and are suspended in the space, partially three-dimensionally. A fixed bearing and a movable bearing ensure mobility in the event of fuselage deformations. In this case, large movements or deformations of the fuselage are immediately visible to the passenger.

Elastic visual covers within or behind the joints, such as weatherstripping ("Kederbänder"), routinely malfunction during daily operation and require regular repair.

Furthermore, the required removal, installation, maintenance, and repair of the window panels or window front plates are time-consuming and costly factors in daily operation.

The components and joints in the spherical areas of the cabin are particularly subjected to special requirements.

SUMMARY OF THE INVENTION

According to one embodiment of the joint cover, a joint cover for covering a joint between a first element and a second element in an aircraft comprises a clamp section and a cover section, the cover section being implemented for covering a joint between a first element and a second element, the clamp section being implemented for attaching the joint cover on at least one third element in such a way that the first and the second element are movable in relation to one another.

According to one embodiment of the joint cover, a joint cover for aircraft ensures simple and secure covering of joints.

A joint cover may be capable of visually and mechanically shielding the joint which exists between two (possibly movably mounted) wall or ceiling panel elements. The joint cover can be attached to the primary structure of the aircraft or to one of the wall panel elements, for example. One advantage is that passengers may no longer be able to perceive deformations of the fuselage directly via changes of the joint width. Another advantage is that objects, such as fingers and other object, are prevented from entering the gap and becoming squeezed in an open joint, because the cover section covers the joint not only visually, but rather also mechanically, preventing the intrusion of an object.

According to one embodiment of the joint cover, a joint cover is for covering a joint between a first element and a second element in an aircraft, wherein the first element is a first interior furnishing of an aircraft and the second element is a second interior furnishing of an aircraft. One advantage is that joints between aircraft interior furnishings may thus be covered protected securely.

According to one embodiment of the joint cover, a cover section comprises an elastic material with the cover section having a curvature in the relaxed state and biasing against the front sides of the first element and the second element after mounting of the joint cover in the joint. Such a cover section is capable of exerting a mechanical traction on the clamp section located behind it after installation of the joint cover. Such a cover may also assume a closely fitting position to the first element and the second element such that objects may not be pushed between the joint cover and the elements.

According to one embodiment of the joint cover, a clamp section has a second portion, which may be pushed through the joint during mounting of the joint cover. A rear area being applied to the back of the first element and the second element after mounting of the joint cover in the joint prevents detachment of the joint cover from the joint.

In one example, a joint cover may be mounted easily and rapidly in the joint simply by pressing the joint cover into the joint. The rear area of the clamp section is compressed for this purpose, for example, and expands correspondingly after being pushed in, so that it prevents the joint cover from being pulled out of the joint later.

According to one embodiment of the joint cover, a first element and the second element are panels which may change their position or shape in relation to their surroundings during flight operation, with the joint cover largely following the movements of the first element and the cover section always being pressed against the first element and the second element.

A joint cover may be connected easily to the first element. A bias force may be created between the joint cover and the first element such that the joint cover tightly fits and substantially seals the joint from intrusion of objects, for example, using a clamp section.

According to one embodiment of the joint cover, a clamp section has a second portion, which is fixedly connected to the cover section. The second portion or the first portion of the clamp section may be attached to the first element with the attachment being performed by way of gluing, clipping, ultrasonic welding, screwing, riveting, or by any adhesive force.

A joint cover is thus specified which is multi-functionally mountable on multiple surfaces in the aircraft.

According to one embodiment of the joint cover, the joint cover also comprises a component selected from the group consisting of illumination device, sensor device, loudspeaker, and display device.

According to one embodiment of the joint cover, at least a portion of the cover section comprises a translucent material, so that light may pass through the translucent portion of the joint cover.

The design of the joint cover and therefore of the entire aircraft cabin may thus be adapted to the individual customer wishes. According to other embodiments, the joint cover is usable as an information carrier, such as a cable chase for electrical cables or optical fibers.

According to one embodiment of the joint cover, a joint cover is implemented as an extruded profile. An extruded profile or extruder profile made of plastic offers one advantage of cost-effective manufacture as an endless component. Sealing elements and undercuts may be included. Cutting or shortening to the required component length offers the possibility of using these joint parts in the retrofitting of existing cabins. Another advantage is that a suitable material is capable of making installation of these parts in a curved section. For example, an extruded profile may be adapted to the component geometry and to the shifting surfaces using materials that are sufficiently flexible. Corresponding surfaces and color choices may be used for corporate purposes by the customer.

According to one embodiment of the joint cover, the joint cover is implemented as an injection molded part. Many advantages are offered using three-dimensional, injection molded parts. Installation preparation for illumination elements, sound elements (loudspeakers), and sensors or display devices may especially be implemented expediently in an injection molded part, for example. Innovative design elements may be manufactured and installed in the cabin through the installation variations and combination of transparent and opaque materials with numerous variations of the surface molding. Complex edge processing of the components covered in this area may be omitted. Extruded and injection molded components may be combined in a joint cover system, for example.

BRIEF DESCRIPTION OF THE DRAWINGS

Some examples are described with reference to the drawings. Identical reference numbers may be used for identical or similar elements illustrated in the drawings, in order to make comparisons among the examples more readily apparent.

DETAILED DESCRIPTION

The examples described and the drawings rendered are illustrative and are not to be read as limiting the scope of the invention as it is defined by the appended claims.

Figure 1:
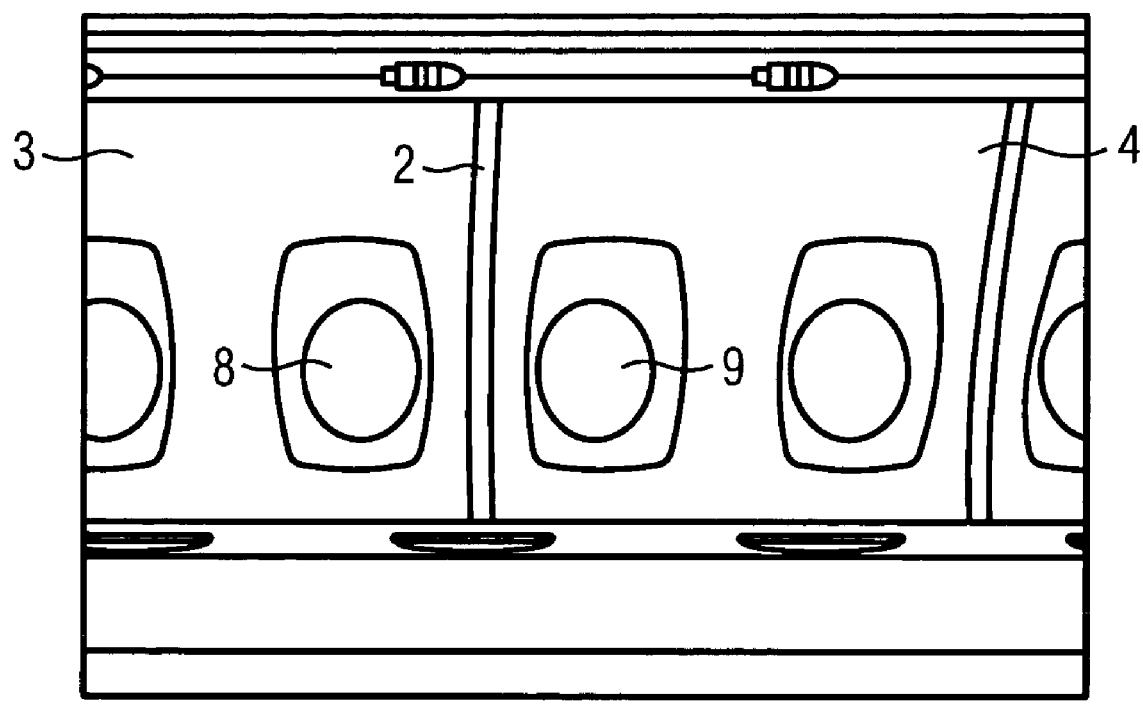
FIG. 1 shows a schematic illustration of a window area in an aircraft cabin.

FIG. 1 shows a schematic illustration of a window area in an aircraft cabin. In this example, the window area has different wall panels or window panels or window front plates 3, 4 which receive the windows 8, 9. Wall panels, window panels and window front plate are examples of interior finishings. Because of the deformation of the aircraft fuselage during flight, such as occurs when pressure differences between the inside and the outside of the fuselage increase as an aircraft ascends to a cruising altitude, deformation and relative displacement of the window panels 3, 4 in relation to one another and the other panels may occur, for example. For this reason, the side panels 3, 4 are fixed at a distance to one another on the primary structure of the aircraft or other supporting parts. The joint lying between the side panels 3, 4 expands or contracts during flight.

The joints are an essential aesthetic, constructive, and functional element in the interior component equipment of a means of transportation (this refers here not only to aircraft, but rather also other means of transportation, such as bus, train, ship, spacecraft or other means of transportation). A high degree of visible design quality, product information, effect, and production of trust may be achieved with the passengers through the joint cover having its cover section 2, which is located in the direct visual range of the passenger. Passengers feel uneasy if they are able to observe relative motion between these parts.

Information media, such as LED arrays, loudspeakers, odor devices, display screens, or info screens may be integrated in examples of a joint cover according to the present invention. Furthermore, sensor systems for contactless function may be installed in the joint cover, which ensure increased comfort of the passenger.

Figure 2:
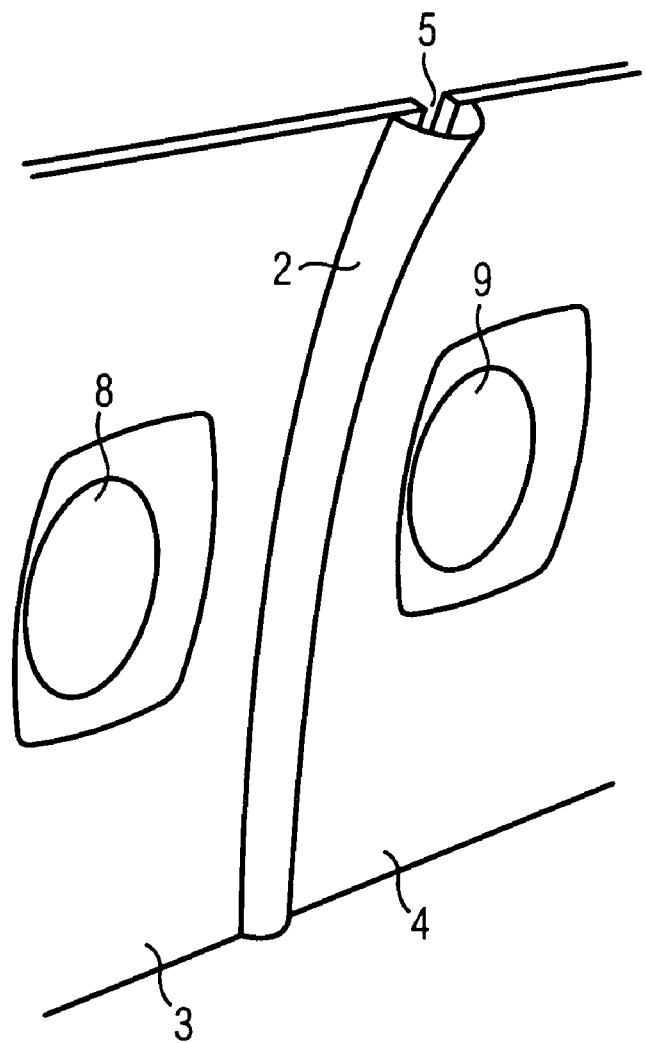
FIG. 2 shows a schematic illustration of an example of a joint cover.

FIG. 2 shows a schematic illustration of a joint cover. The joint cover, which has a cover section 2, is mounted between the panels 3, 4. In this example, the joint 5, which is located between the two panels 3, 4, is completely covered by the cover section 2.

Because of the construction of the tailored joint cover, this component may be used for any window-panel joint. All variations of the joint cover may be attached and installed easily through clamping, clipping, plugging in, ultrasonic welding, screwing, riveting, or using an adhesive or clamping force, such that the joint is substantially concealed by the cover.

Since the joints are covered by the joint cover, no complex joint radii are necessary in the manufacturing of the window panels, through which production costs may be saved. All tolerances are covered and, in particular, a cover of the joint is provided which also has an injury-reducing function in case of an accident, since the edges of the side parts 3, 4 are concealed by the joint cover and, furthermore, the joint cover according to the disclosure may ensure additional fixing of the side parts in relation to one another. Weatherstripping ("Kederbänder") or "filler strips" may be omitted at this location.

Figure 3:
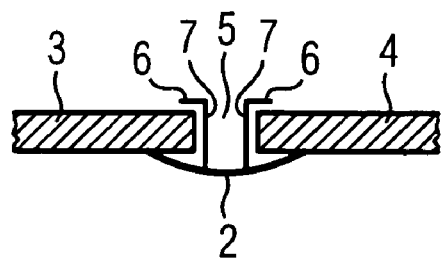
FIG. 3 shows a schematic cross-sectional illustration of the joint cover of FIG. 2.

FIG. 3 shows a schematic cross-sectional illustration of the joint cover from FIG. 2. As may be seen from FIG. 3, the joint cover includes a cover section 2 and a clamp section 6, 7 is positioned between the two panels 3, 4 ,which are for finishing the interior. The cover section 2 is made of an elastic material for this purpose, which has a curved shape in the relaxed state. In the mounted state, the cover section 2, as shown in FIG. 3, presses tightly against the first panel 3 and the second panel 4. For this purpose, the cover section 2 may be under tension or biased, so that it is ensured that the cover section 2 presses tightly against the surfaces of the panels 3, 4 even in the event of motion of the panels 3, 4 in relation to one another.

The dimensioning of the cover section 2 is kept larger than the width of the joint 5 for this purpose. A dimension may be selected such that complete coverage of the joint is always ensured, even in the event of deformation of the aircraft fuselage.

The clamp section 6, 7 consists of a rear area 6 and a front area 7, which is solidly connected to the cover section 2. The rear area 6 is used for the purpose of preventing the cover from slipping out of the joint. In order to hold the joint cover sufficiently solidly in the joint, adhesive forces, which are generated by the spring force of the cover section 2, may be exploited, for example. For this purpose, the outer edges of the cover 2 press against the surfaces of the panels 3, 4 and thus generate a force which pulls the rear area 6 of the clamp section 6, 7 against the backs of the panels 3, 4 such that the joint cover clamps or applies a bias force against the panels 3, 4.

Other attachments may also be used that effectively seals the joint from intrusion of a foreign object. For example, the front area 7 or the rear area 6 of the clamp section 6, 7 may be glued, clipped, welded, screwed, or riveted to the first interior furnishing 3, so that a rigid connection is ensured here and the joint cover thus largely follows the movements of the first interior furnishing 3. Interior furnishing 4, in contrast, may move in relation to the joint cover, complete coverage of the joint 5 always being ensured because of the dimensions of the cover 2.

Figure 4:
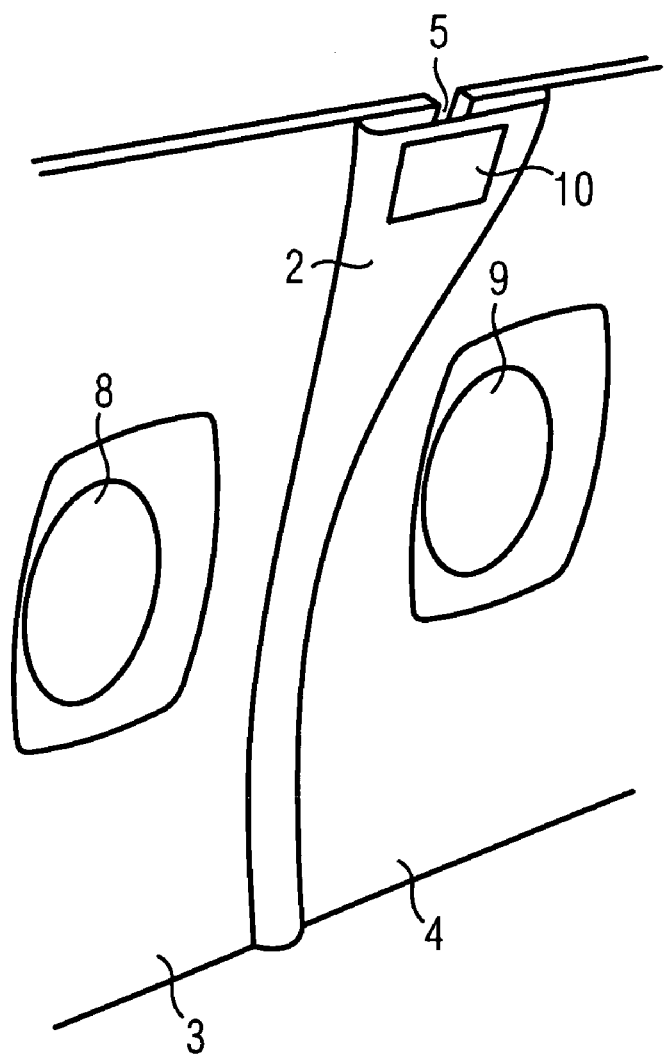
FIG. 4 shows a schematic illustration of another joint cover.

FIG. 4 shows a schematic illustration of a further joint cover according to one embodiment. The cover section 2, which covers the joint 5, has a monitor 10 in this case, via which information may be delivered to the passenger. Instead of a monitor 10, an LED display or another type of info screen may also be integrated into the joint cover. This integration is performed in the manufacturing process of the joint cover, for example, through which the final mounting of the unit is made easier.

Figure 5:
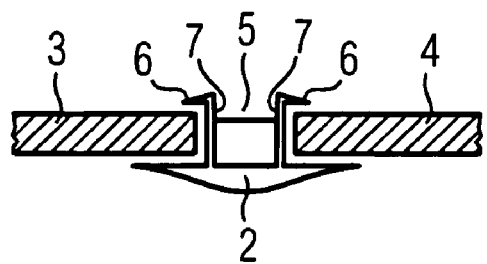
FIG. 5 shows a schematic cross-sectional illustration of the joint cover of FIG. 4.

FIG. 5 shows a schematic cross-sectional illustration of the joint cover from FIG. 4. In this example, the cover section 2 is implemented as a volume component whose back presses flat against the panels 3, 4. The rear area 6 of the clamp section 6, 7 works together with the cover section 2, seating the joint cover in the joint 5.

Figure 6:
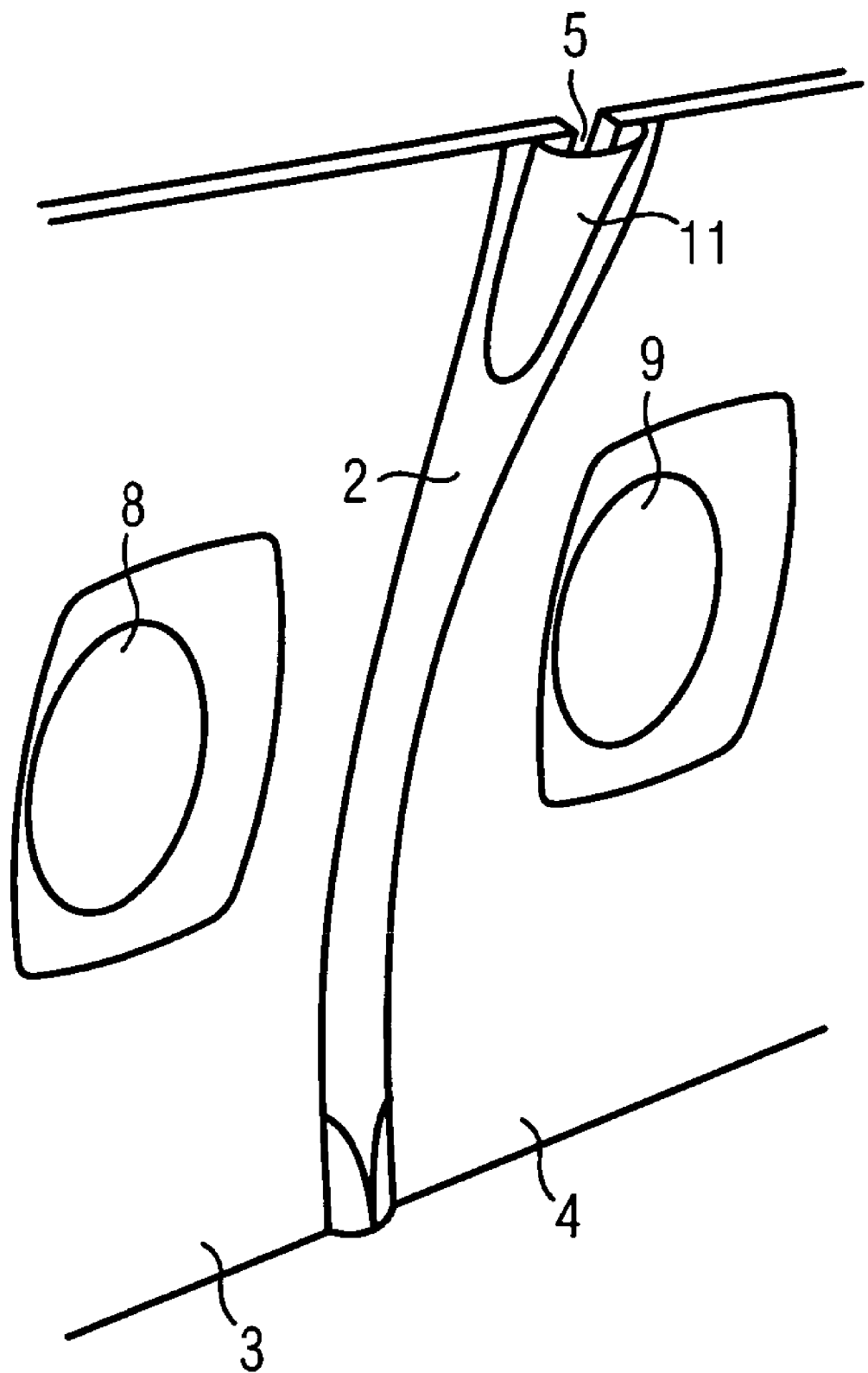
FIG. 6 shows a schematic illustration of yet another joint cover.

FIG. 6 shows a schematic illustration of a further joint cover according to one example of the joint cover. In this case, the upper area of the cover section 2 has a translucent material. This translucent material 11 may be illuminated from the rear, for example, through a light source integrated behind the joint cover or in the joint cover. In this example, diverse color effects or light effects may be adhered and act in a pleasant or calming way or even informatively on the sense organs of the passengers.

The translucent material 11 may be implemented, for example, in the form of a translucent polyester film having a special coating. The polyester film 11 may, for example, be implemented in the form of a plotter film which is suitable for light advertisement.

Figure 7:
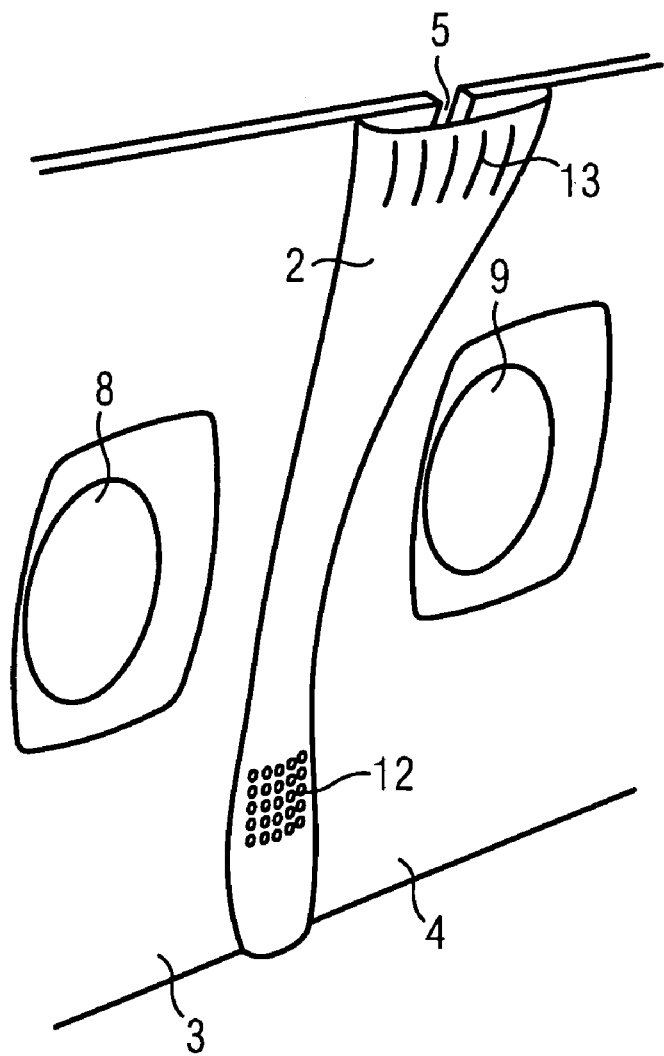
FIG. 7 shows a schematic illustration of still another joint cover.

FIG. 7 shows a schematic illustration of a joint cover according to one embodiment. In this example, the cover section 2 has sensor systems 12 which are implemented for contactless measurement of physical parameters. These may be temperature sensors, ambient humidity sensors, odor sensors, light sensors, or sound sensors, for example. This sensor system is essentially used for the purpose of obtaining data about the physical conditions in the area of the passenger and then relaying this data to a corresponding processor which may perform an analysis and a regulation on this basis.

An LED light array may also be integrated in the area of the sensor systems 12 (or even in another area), which may emit light signals or light signs. These may be seat numbers, emergency signs, or prohibition or request signs, for example.

An LED light array of this type or even a monitor 10 may be used to represent specific information in the aircraft cabin, which reproduces the information as writing or a pictogram. This is the reproduction of commands or warnings such as "no smoking" or "fasten seat belt", for example.

The information which is represented here may be of a greatly varying nature. For example, it is possible to image static information, for example, in the form of "no smoking" signs or requests to fasten seat belts or the like. Information in regard to the appropriate seat row or the appropriate seat or even emergency exit information may also be imaged here. For the emergency exit information, for example, arrows may be shown which point in the direction of the closest possible emergency exit. However, dynamic information may also be shown, such as entertainment films or visual stimuli which encourage well-being. Of course, other information which relates to technical data may also be displayed individually. This may be the current airspeed, the current altitude, the distance to the destination, the external temperature, or even the current temperature at the destination, for example. In one example, a control unit is provided (not shown in FIG. 7), which is also integrated into the joint cover or in the passenger seat, and which has a corresponding data memory, so that the passenger may individually select all information which he requires.

An arrangement of slots 13 is integrated in the upper area of the cover 2, which is implemented for the acoustic emission of a loudspeaker integrated behind or within the joint cover (not shown in FIG. 7).

Figure 8:
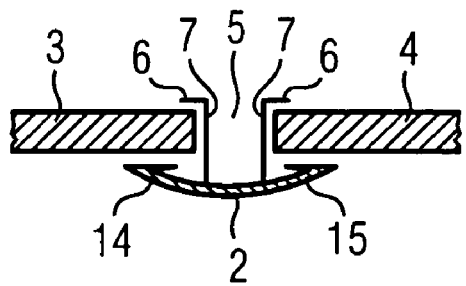
FIG. 8 shows a schematic cross-sectional illustration of the joint cover of FIG. 7.

FIG. 8 shows a schematic cross-sectional illustration of the joint cover from FIG. 7. Here, the cover section 2 has angles 14, 15 on its sides, which press flat against the surfaces of the panels 3, 4.

Figure 9A:
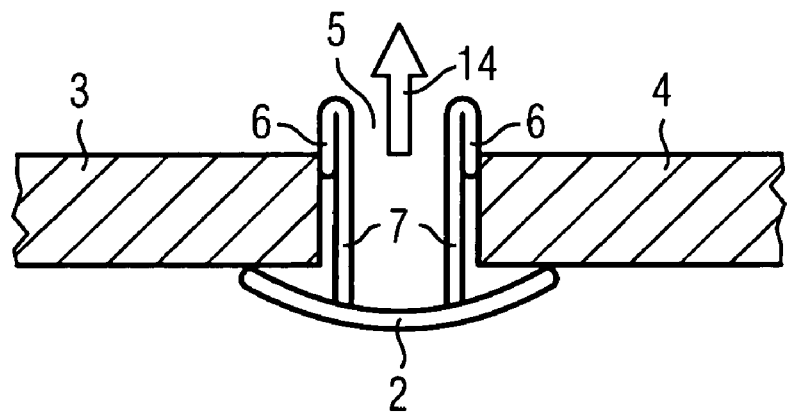
FIGS. 9A-9C show a schematic cross-sectional illustration of the joint cover of FIG. 2 in three different phases of the mounting.
Figure 9B:
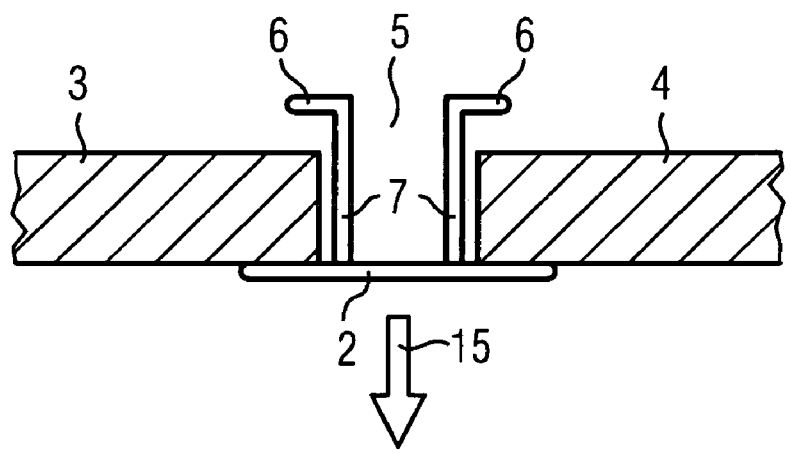
Figure 9C:
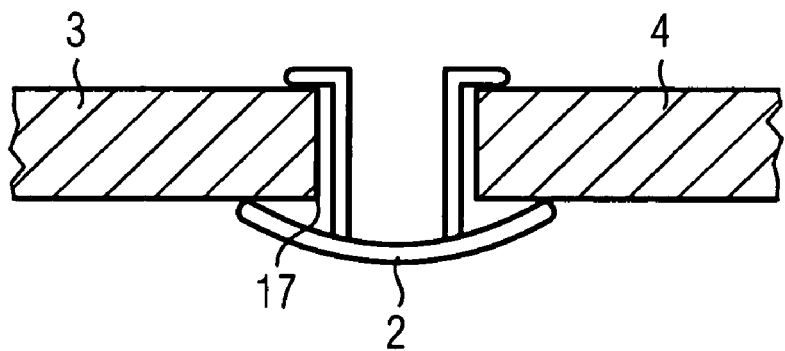

FIG. 9A-9C shows a schematic cross-sectional illustration of the joint cover of FIG. 2 in three different stages of mounting.

As shown in FIG. 9A, the rear section 6 of the clamp section 6, 7 is folded or compressed as the joint cover is pushed into the joint 5. This folding is made possible, for example, in that the rear area 6 is made of a material which may be bent (elastically flexed) in the appropriate direction. This may be an appropriately molded rubber element or softened plastic element, for example. Joints may also be provided at the transitions between front area 6 and rear area 7 of the clamp section 6, 7, which allow folding of the rear area 6, so that the joint cover may be pushed into the joint 5 even though the cross-section of the clamp 6, 7 is larger in the tensioned state than the width of the joint 5. The pushing is performed in the direction of the arrow 31.

FIG. 9B shows the second phase of the mounting of the joint cover. The rear area 6 of the clamp section 6, 7 is now pushed completely through the joint 5 and is located in a folded out or relaxed state. The cover section 2, which is made of an elastic material and has a curvature in the relaxed state, is pressed against the interior furnishings 3, 4 and thus exerts a strong pressure on the panels 3, 4 via its bias force, through which the clamp section 6, 7 is pulled in the direction of the arrow 32.

FIG. 9C shows the third and final phase of the joint cover mounting. The rear area 6 of the clamp section 6, 7 now presses solidly against the surfaces of the panels 3, 4 and is thus clamped solidly against the panels 3, 4 together with the (still tensioned) cover section 2. Of course, adhesive may also be provided in the area 17 for further support of the joint cover on the panel 3, through which the joint cover may be solidly bonded to the panel 3.

The tailored joint cover represents a cost-effective possibility for implementing different cabin design variations. Through the change of the visually important area of the perceptions of the passengers, novel cabin effects may be achieved with a mass-produced accessory part (joint cover).

The formal conception of the standard cabin may be adapted to the individual customer wishes. Using additional components, such as illumination, loudspeakers, display screens, olfactory devices, or translucent materials, the overall impression of the cabin may be changed specifically for the customer. The adaptation of the cabin layout to the customer requirements may therefore be performed rapidly and cost-effectively.

Within this conception, for leasing products or secondhand transportation means, the cabins may be adapted to the customer wish without expensive remodeling and corresponding recertification in the event of an operator change.

All joints may be provided with the joint cover (even later!). Furthermore, it is possible to cover the joint cover with customer-specific decorative film or to provide it with an appropriate textured enamel.

Before the component is glued or mounted in another way, auxiliary assemblies, such as light functions, olfactory units, loudspeakers, or mini screens, may be mounted. Furthermore, the customer-specific cover part may also have special functions, such as LED light effects.

Figure 10:
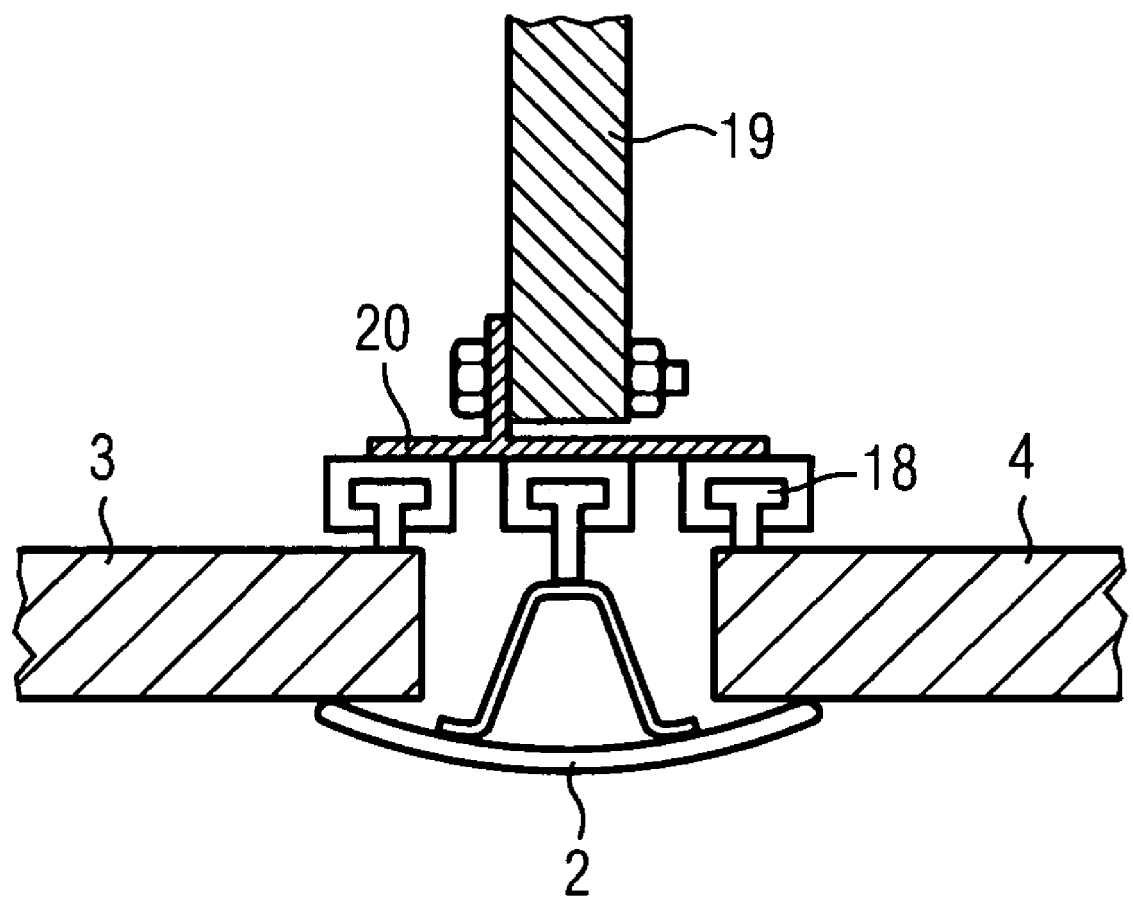
FIG. 10 shows a schematic cross-sectional illustration of a further joint cover according to one embodiment of the present invention.

FIG. 10 shows a schematic cross-sectional illustration of another joint cover. As shown in FIG. 10, the joint cover may be attached parallel to the window panels directly on the aircraft structure, such as aircraft frame 19. The two panels 3, 4 may move independently from the joint cover in this way. The attachment of the panels and the joint cover may be performed via standard clips 18, which may be mounted on a support plate 20.

The joint cover is not restricted in its implementation to one embodiment illustrated in the figures. Rather, multiple variations are conceivable, which make use of the achievement of the object shown and the principles disclosed, even with significantly different embodiments.

Furthermore, it is to be noted that "comprising" does not exclude other elements or steps and "a" or "an" does not exclude multiples. In addition, it is to be noted that features or steps which have been described with reference to one of the above exemplary embodiments may also be used in combination with other features or steps of other exemplary embodiments described above. Reference numbers in the claims are not to be considered as restrictions.

What is claimed:

1. A joint cover for covering a joint between a first element and a second element in an aircraft, the joint cover comprising:
    a cover section being of a deformable material and having a back surface;
    a clamp section having a first portion coupled to the cover section by a second portion, the first portion being joined at a first end of the first portion to the second portion and having a distal end opposite of the first end and extending therefrom such that a front surface, disposed between the first end and the distal end, is oriented in opposition to the back surface of the cover section, and the cover section is adapted to cover the joint between the first element and the second element, and the deformable material of the cover section is deformed during mounting of the joint cover such that the first portion is flexibly inserted through the joint between the first element and the second element, the cover section exerts a residual bias force after mounting, clamping the first element and the second element between the back surface of the cover section and the front surface of the first portion, and
    the first element and the second element are capable of moving in relation to one another allowing the joint to contract and expand during flight operations of the aircraft when the first element moves toward or away from the second element, respectively, without exposing the joint, and the joint cover is securely mounted.

2. The joint cover of claim 1, wherein the first element is a first wall panel, a first window panel or a first front plate of the aircraft and the second element is a second wall panel, second window panel or a second front plate of the aircraft.

3. The joint cover of claim 1, wherein the cover section has a curvature when undeformed and is capable of being flattened when the deformable material of the cover section is deformed during mounting and elastically restores at least a portion of the curvature after mounting.

4. The joint cover of claim 1, wherein the first element and the second element are panels adapted to change their position or shape in relation to their surroundings during flight operation;
    wherein the joint cover is mounted such that the joint cover moves substantially with movement of the first element; and
    wherein the cover section continuously abuts against the first element and the second element.

5. The joint cover of claim 1, wherein the second portion rigidly attaches the clamp section to the cover section.

6. The joint cover of claim 5, wherein the first portion or the second portion of the clamp section is attached to the first element using gluing, clipping, ultrasonic welding, screwing, riveting, or an adhesive force.

7. The joint cover of claim 1, further comprising a component selected from the group consisting of an illumination device, a sensor device, a loudspeaker, and a display device.

8. The joint cover of claim 1, wherein the cover section comprises a translucent material such that light may pass through the cover section.

9. The joint cover of claim 1, wherein the clamp section or the cover section comprises an extruded profile.

10. The joint cover of claim 1, wherein the clamp section or the cover section comprises an injection molded portion.

11. An aircraft comprising the joint cover of claim 1.

12. The joint cover of claim 1, wherein the clamp section comprises a material that is elastically flexible.

13. The joint cover of claim 12, wherein the material is of a rubber or a plastic material.

* * * * *